(12) United States Patent
Konishi et al.

(10) Patent No.: US 8,259,886 B2
(45) Date of Patent: Sep. 4, 2012

(54) COMMUNICATION APPARATUS

(75) Inventors: Shinya Konishi, Kanagawa (JP); Norio Arai, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 733 days.

(21) Appl. No.: 12/457,292

(22) Filed: Jun. 5, 2009

(65) Prior Publication Data
US 2009/0323878 A1  Dec. 31, 2009

(30) Foreign Application Priority Data
Jun. 25, 2008  (JP) .................................. 2008-165282

(51) Int. Cl.
*H04L 7/00* (2006.01)
(52) U.S. Cl. ........ 375/365; 327/213; 327/295; 327/296; 365/233.11
(58) Field of Classification Search .................. None
See application file for complete search history.

(56) References Cited

U.S. PATENT DOCUMENTS
2003/0210756 A1  11/2003  Ito

FOREIGN PATENT DOCUMENTS
JP  3490078 B2  11/2003
JP  3792904 B2  4/2006

*Primary Examiner* — David C. Payne
*Assistant Examiner* — Adolf Dsouza
(74) *Attorney, Agent, or Firm* — McGinn IP Law Group, PLLC

(57) ABSTRACT

A communication apparatus including a clock generation circuit outputting a plurality of clocks, each clock having a different phase from the other, a synchronization detection block receiving a sync word and a payload having a predetermined length after receiving the payload, sampling the sync word by using each of the plurality of clocks and to output a first signal indicating a clock or clocks capable of sampling the sync word successfully, the synchronization detection block being capable of sampling the payload by using a clock or clocks, a clock phase selection block coupled to the synchronization detection block to receive the first signal, and a clock gate unit to receive each of the plurality of clocks and the second signal to output the selected one of the plurality of clocks, and not to output a rest of the plurality of the clocks based on the second signal.

4 Claims, 9 Drawing Sheets

COMMUNICATION APPARATUS

FIELD OF THE INVENTION

The present invention relates to a communication apparatus that uses multi-phase clocks to detect synchronization and more particularly to a communication apparatus that stops all the clocks that are not required for sampling transmission signals, respectively.

BACKGROUND OF THE INVENTION

A radio communication LSI consists of a high frequency (RF) LSI and a baseband (BB) LSI. The high frequency LSI processes signals received by an antenna as analog signals. The baseband LSI processes transmission signals as digital signals before modulation or after demodulation.

And when in high speed synchronous communications between the high frequency LSI and the baseband LSI configured as described above, sometimes such troubles as signal delays and jittering occur in the transmission path. At this time, if communications are made according to clock signals that are asynchronous between those LSIs, the receiving side LSI often fails in correct receiving of data. This has been a problem. To avoid this problem, therefore, the receiving side LSI is required to control the clock phase used to receive data so as to receive the object data correctly. Japanese Patent No. 3490078 and Japanese Patent No. 3792904 disclose examples of how such a receiving LSI controls the clock phase to receive data respectively.

In case of the baseband signal receiving circuit disclosed in Japanese Patent No. 3490078, plural clock phases are used to sample the sync word included in each inputted baseband signal to determine a sampling clock phase according to the number of clock phase change points when the baseband signal generates a change point at its rising or falling. Then, the receiving circuit uses the determined sampling clock to sample the object baseband signal, thereby enabling the symbol of the baseband signal (serial signal) to be demodulated correctly.

In case of the receiving unit disclosed in Japanese Patent No. 3792904, which describes its related techniques, upon receiving the preamble part of an object transmission signal, the receiving unit uses a high speed clock to sample the object signal. And upon receiving the data part that follows the preamble part, the receiving unit switches the high speed clock to a low speed clock. The receiving unit can thus reduce the power consumption required by over-sampling.

SUMMARY

However, when communications are made between communication systems by employing a general frame configuration (in which each transmission signal is composed of a frame consisting of a preamble part and a payload part), the baseband signal receiving circuit disclosed in Japanese Patent No. 3490078 samples each baseband signal that includes a payload part without stopping any clocks except for the determined sampling clock. As a result, the communications come to require wasteful power consumption. This has also been a problem.

Under such circumstances, the communication apparatus of the present embodiment includes a clock generation circuit outputting a plurality of clocks, each of said plurality of clocks having a different phase from each other; a synchronization detection block receiving a sync word and a payload having a predetermined length after receiving said payload, sampling said sync word by using each of said plurality of clocks and to output a first signal indicating a clock or clocks capable of sampling said sync word successfully, said synchronization detection block being capable of sampling said payload by using a clock or clocks inputted thereinto; a clock phase selection block coupled to said synchronization detection block to receive said first signal to select one of said plurality of clocks in accordance with said first signal and to output a second signal indicating a selected clock; and a clock gate unit coupled between said clock generation circuit and said synchronization detection block and coupled to said clock phase selection block to receive each of said plurality of clocks and said second signal to output said selected one of said plurality of clocks to said synchronization detection block and not to output a rest of said plurality of said clocks based on said second signal during a period corresponding to said predetermined length of said payload.

Furthermore, the communication apparatus of the present embodiment can identify each clock that can sample the sync word correctly from among plural clocks. Then, the apparatus selects a single clock of the identified clocks to sample the transmission signal and outputs an instruction for stopping the supply of other not-selected clocks. Upon receiving the clock stop instruction, the subject unit of the communication apparatus supplies the selected clock to the destination and stops other not-selected clocks. Consequently, after the supply clock is selected, other unnecessary clocks are stopped, thereby the LSI power consumption is reduced.

According to the present embodiment, therefore, it is possible to provide a communication apparatus capable of stopping the supply of unnecessary clocks, thereby reducing the LSI power consumption.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

First Embodiment

Figure 1:
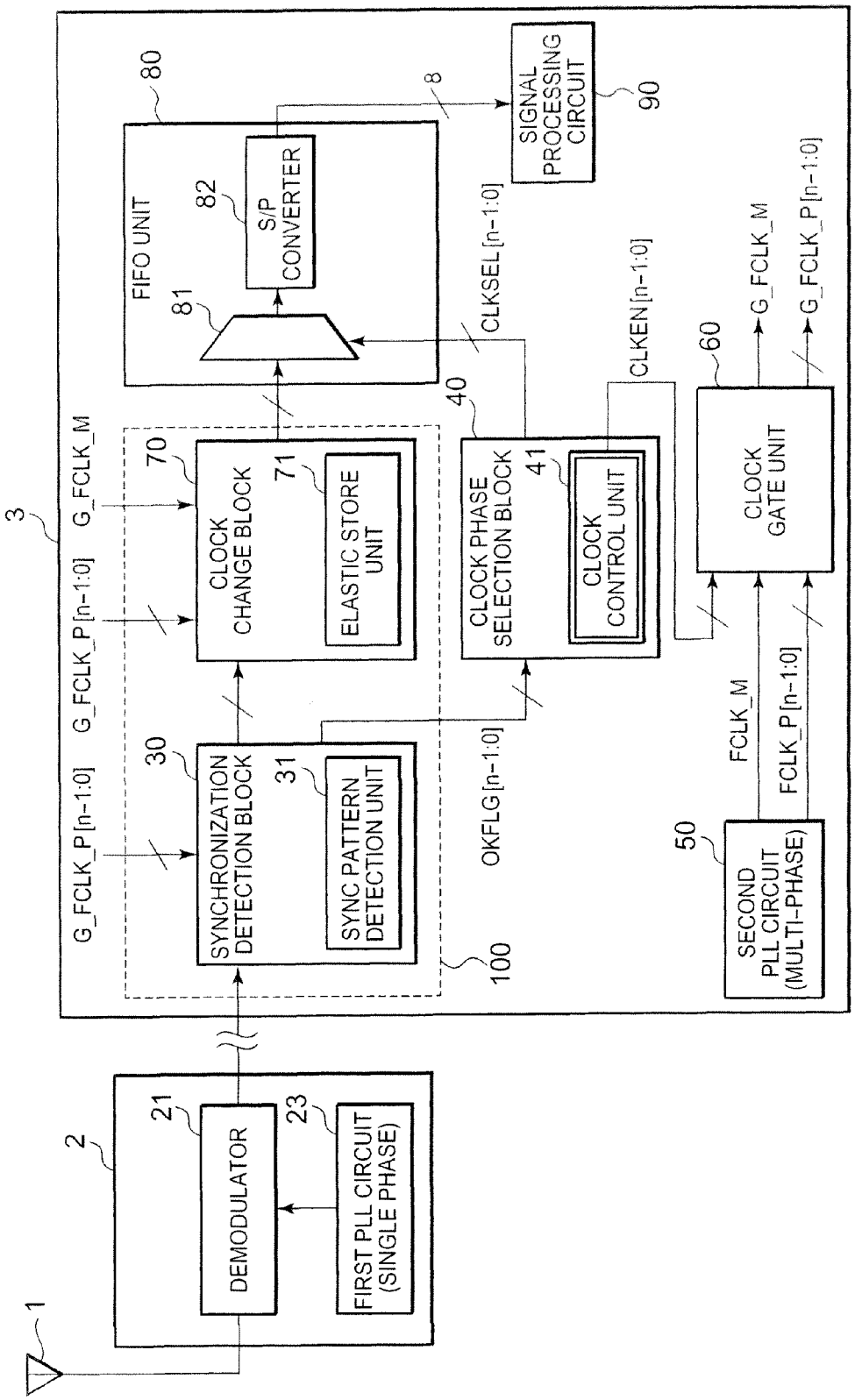
FIG. 1 is a block diagram of a receiving apparatus in a first embodiment of the present invention.

Hereunder, there will be described the preferred embodiments of the present invention in detail with reference to the accompanying drawings. At first, there will be described a configuration of a communication apparatus (a receiving apparatus concretely) in this first embodiment. As shown in FIG. 1, the receiving apparatus includes an antenna 1, a high frequency (RF) unit 2, and a digital baseband (DBB) unit 3.

The RF unit 2 includes a demodulator 21 and a first PLL (Phase Locked Loop) circuit 23. The demodulator 21 demodulates radio signals received through the antenna 1 to generate data signals. Each of the data signals is parallel data signal having, for example, an 8-bit width. The demodulator 21 converts those parallel data to serial data and outputs the converted data as transmission signals. Each transmission signal consists of a data string having a single-bit width, for example.

The transmission signal in this first embodiment includes a sync word region and a payload region in its data string. The sync word region stores sync word data set beforehand in the subject system. The payload region stores data to be processed in the system. The system sends the sync word and the payload sequentially. Then, the sync word manages the unit of payload transmission.

The first PLL circuit 23 outputs the single phase first clock. This first clock is used to process the operation of each data string in the demodulator 21.

The DBB unit 3 includes a synchronization detection block 30, a clock phase selection block 40, a second PLL circuit 50, a clock gate unit 60, a clock change block 70, an FIFO unit 80, and a signal processing circuit 90. The dot-line 100 encloses the synchronization detection block 30 and the clock change block 70. The description of the enclosed area will be made later.

The synchronization detection block 30 includes a sync pattern detection unit 31. The sync pattern detection unit 31 receives each transmission signal with use of plural clocks of which phases are different from one another. The sync pattern detection unit 31 then samples the sync word included in the received transmission signal with use of those clocks of which phases are different from one another and compares the result of the sampling with a predetermined sync pattern. After this, the sync pattern detection unit 31 identifies each clock that has successfully sampled the sync word matching with the predetermined sync pattern from among the plural clocks. In other word, the sync pattern detection unit 31 samples each inputted sync word with use of the n clocks G_FCLK_P [n−1: 0] of which phases are different from one another. The sync pattern detection unit 31 then identifies each clock that has successfully sampled the predetermined sync pattern from among the n clocks of which phases are different from one another and outputs a signal OKFLG [n−1: 0] that denotes the identified clock to the clock phase selection block 40. For example, the OKFLG [n−1: 0] comes to have a bit "1" corresponding to each clock that has successfully sampled the predetermined sync pattern and comes to have "0" bits corresponding to all the clocks that have failed to sample the predetermined sync pattern. The clock G_FCLK_P [n−1: 0] is a phase clock assumed after being gated by the clock gate unit (to be described later). The details of the gating by the clock gate unit 60 will be described later.

Figure 2:
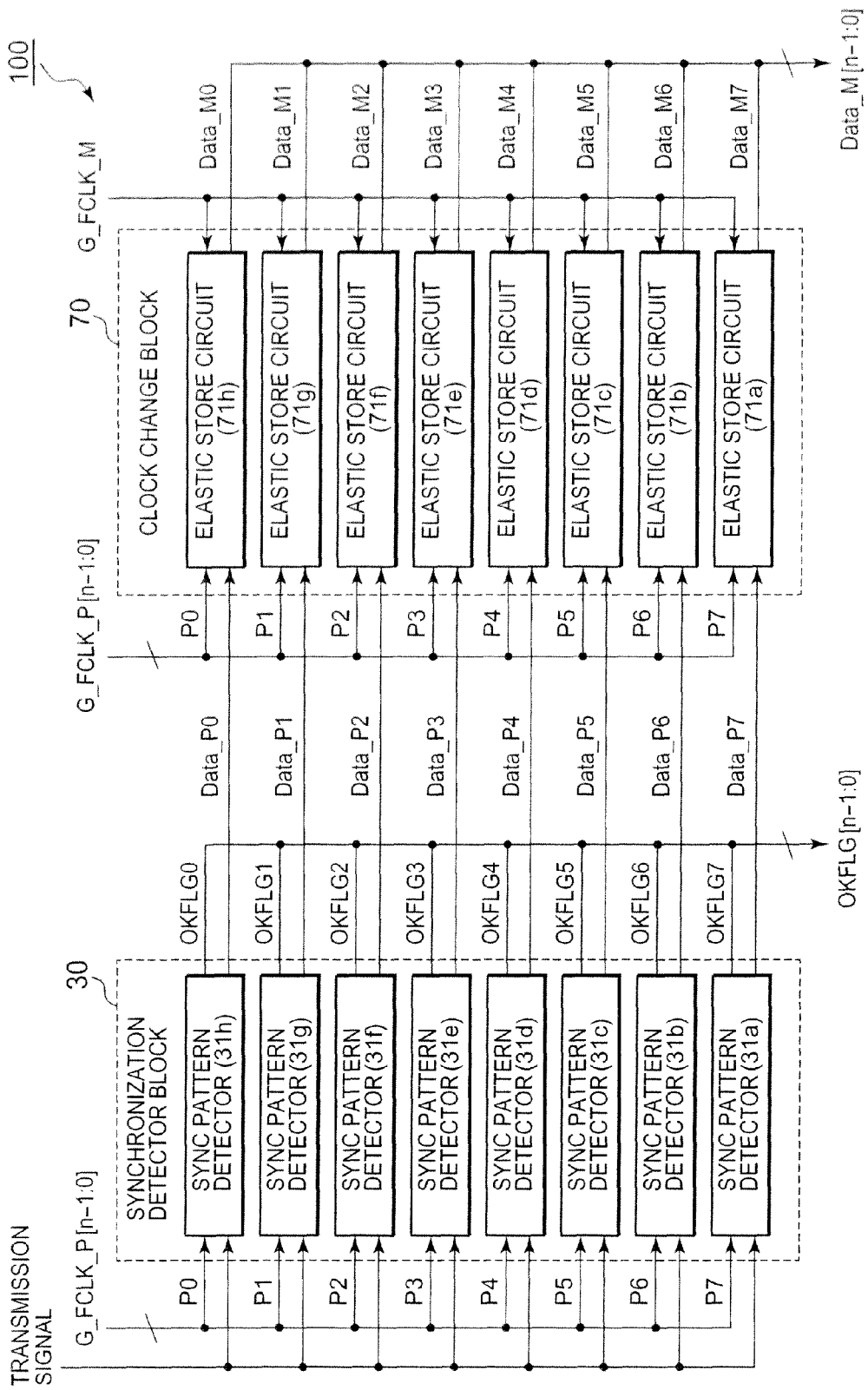
FIG. 2 is a block diagram of a synchronization detection block and a clock change block in the first embodiment of the present invention.

Next, there will be described a detailed configuration of the synchronization detection block 30 with reference to FIG. 2. FIG. 2 is a detailed block diagram of the area denoted by a dot line 100 in FIG. 1 in an example. The area includes the synchronization detection block 30 and the clock change block 70 (to be described later). As shown in FIG. 2, in the synchronization detection block 30, the sync pattern detection unit 31 consists of plural sync pattern detectors 31a to 31h. In this first embodiment, each of the sync pattern detectors 31a to 31h carries out character synchronization according to the object sync word. In the example shown in FIG. 2, there are eight phases for the clock G_FCLK_P [n−1: 0]. The eight clocks of which phases are different from one another G_FCLK_P0 to 7 are used to operate the sync pattern detectors 31a to 31h.

Each of the sync pattern detection units 31a to 31h, upon receiving a transmission signal, samples the sync word included in the signal with of its corresponding one of the clocks G_FCLK_P0 to 7. Concretely, the sync word detection unit samples the sync word at the rising (or falling) edge of the clock. After this, the sync pattern detection unit (31a to 31h) compares the result of the sampling of the sync word included in the transmission signal with a predetermined sync pattern (stored in, for example, a memory such as a register of the DBB unit 3). Then, each of the sync pattern detection units 31a to 31h identifies each clock that has successfully sampled the sync word matching with the predetermined sync pattern from among the clocks G_FCLK_P0 to 7. If each of the sync pattern detection units 31a to 31h can sample the predetermined sync pattern correctly by using the supplied clock, the detection unit outputs, for example, an OKFLG signal denoting "1". If each of the sync pattern detection units 31a to 31h fails in sampling of the predetermined sync pattern by using the supplied clock, the detection unit outputs, for example, an OKFLG signal denoting "0". Concretely, for example, the sync pattern detection unit 31a samples the sync word included in the transmission signal by using its corresponding clock G_FCLK_P7. Then, the sync pattern detection unit 31a compares the result of the sampling of the sync word by using the clock G_FCLK_P7 stored in the memory. If they match, the sync pattern detection unit 31a determines that the clock G_FCLK_P7 has successfully sampled the predetermined sync pattern and outputs an OKFLG7 signal denoting "1". Each of the rest sync pattern detection unit 31b to 31h also makes similar operations to output its corresponding one of the OKFLG0 to 6 signals. Consequently, the OKFLG [n−1: 0] comes to have "1" for the bit corresponding to the clock that has successfully sampled the predetermined sync pattern and "0" for all the bits that failed in sampling of the sync pattern. The OKFLG [n−1: 0] is such a parallel signal having plural bits. The synchronization detection block 30 thus outputs the OKFLG [n−1: 0] to the clock phase selection block 40. The parallel signals OKFLG [n−1: 0] output from the sync pattern detection units 31a to 31h are, for example, (OKFLG7, OKFLG6, OKFLG5, . . . , OKFLG0)=(0, 0, 1, 1, 1, 1, 1, 0). The left end bit in the bit string is the MSB (Most Significant Bit) and the right end bit in the bit string is the LSB (Least Significant Bit). In this example, the second to sixth clocks G_FCLK1 to 5 from the LSB are used to denote that the object sync word has been detected correctly.

After receiving a transmission signal, each of the sync pattern detection units 31a to 31h operates according to its corresponding one of the clocks G_FCLK_P0 to 7. Then, as to be described, the clock gate unit 60 carries out gating of the clock G_FCLK_P[n−1: 0]. After this, each of the sync pattern detection units 31a to 31h comes to operate according to only the clock G_FCLK_P [n−1: 0] selected by the clock phase selection block 40. For example, if the clock G_FCLK_P3 is selected from among the clocks G_FCLK_P0 to 7, the clock G_FCLK_P[n−1: 0] denotes the clock G_FCLK_P3 having the selected single phase.

The clock phase selection block 40 then selects a single clock used to sample the object transmission signal from among the clocks G_FCLK_P[n−1: 0] that have successfully sampled the sync word matching with the predetermined sync pattern and outputs an instruction to stop other clocks that are not selected for the sampling. The clock phase selection block 40 includes a clock control unit 41. The clock control unit 41 controls so as to stop those clocks not selected as the sampling clocks and not required for receiving the payload that follows the sync word.

Concretely, the clock phase selection block 40, upon receiving a signal OKFLG [n−1: 0] output from the synchronization detection block 30, selects one of the plural clocks G_FCLK_P [n−1: 0] so as to use it for sampling. The clock phase selection block 40 then outputs a selection signal CLKSEL [n−1: 0] denoting the selected clock to the selector 81 of the FIFO unit 80. The selection signal CLKSEL [n−1: 0] is a parallel signal denoting an output from the clock phase selection block 40. The bits of the selection signal CLKSEL [n−1: 0] are transmitted in parallel through n signal lines. For example, it is assumed here that a selected sampling clock is denoted with "1" and each clock that is not selected is denoted with "0". For example, it is assumed here that a single phase clock G_FCLK_P [n−1: 0] is selected from among 8-phase clocks G_FCLK_P [n−1: 0] and the clock phase selection block 40 receives a signal (OKFLG7, OKFLG6, OKFLG5, . . . , OKFLG0)=(0, 0, 1, 1, 1, 1, 1, 0) as a signal OKFLG [n−1: 0] output from the synchronization detection block 30. In this case, the clock phase selection block 40 selects the clock G_FCLK_P3 centered in the selectable clocks G_FCLK_P1 to 5. Then, the clock phase selection block 40 outputs a selection signal CLKSEL [n−1: 0] as "00001000". The left end bit is the MSB that denotes whether or not the clock G_FCLK_P7 inputted to the sync pattern detection unit 31a is selected. The right end bit is the LSB that denotes whether or not the clock G_FCLK_P0 inputted to the sync pattern detection unit 31h is selected. In other words, in this example, the clock phase selection block 40 sets "1" for the fourth bit from the LSB and it means that the clock phase selection block 40 has selected the clock G_FCLK_P3 inputted to the sync pattern detection unit 31e. And this means that the selector 81 is operated with the fourth clock G_FCLK_P3 from the LSB.

The clock control unit 41, upon receiving a signal OKFLG [n−1: 0] from the synchronization detection block 30, outputs an enable signal CLKEN [n−1: 0] to the clock gate unit 60. The enable signal denotes the clock selected from among the clocks G_FCLK_P [n−1: 0]. The enable signal CLKEN [n−1: 0] is a parallel signal denoting an output from the clock control unit clock control unit 41. The bits of the enable signal CLKEN [n−1: 0] are transmitted in parallel through n signal lines. For example, each clock selected from among the clocks G_FCLK_P [n−1: 0] is denoted with "1" and other clocks that are to be stopped are denoted with "0" respectively. For example, the clock control unit 41 outputs the enable signal CLKEN [n−1: 0] as "00001000" so as to stop the clocks G_FCLK_P [n−1: 0] of seven phases selected from among the clocks G_FCLK_P [n−1: 0] of eight phases. The left end bit is the MSB that denotes whether or not the clock G_FCLK_P7 inputted to the sync pattern detection unit 31a is stopped. The right end bit is the LSB that denotes whether or not the clock G_FCLK_P0 inputted to the sync pattern detection unit 31h is stopped. In this example, the clock control unit 41 comes to output a signal denoting that the clock G_FCLK_P3 inputted to the sync pattern detection unit 31e is not stopped while other clocks are stopped.

The second PLL circuit 50 generates a master clock FCLK_M and a multiphase clock FCLK_P [n−1: 0]. The second PLL circuit 50 outputs the generated clocks (the master clock FCLK_M and the multiphase clock FCLK_P [n−1: 0]) to the clock gate unit 50. The master clock FCLK_M and the multiphase clock FCLK_P [n−1: 0] in this first embodiment are high speed clocks obtained by multiplying the reference clock. The multiphase clock FCLK_P[n−1: 0] consists of plural clocks having the same speed and having phases that are shifted by 360°/n from one another. In this first embodiment, "n" is assumed to be 8. Consequently, the output of the second PLL circuit 50 has a single bit width and an 8-bit width. Each bit of the output corresponds to one phase clock. Furthermore, in this first embodiment, each of the first and second PLL circuits 23 and 50 generates clocks obtained by multiplying the same reference clock and having the same frequency respectively, and being asynchronous from each other.

The clock gate unit 60, upon receiving an enable signal CLKEN [n−1: 0] from the clock control unit 41, carries out gating of the master clock FCLK_M, as well as gating of the multiphase clock FCLK_P [n−1: 0] supplied from the second PLL circuit 50. Concretely, the clock gate unit 60 carries out gating of the multiphase clock FCLK_P [n−1: 0] and supplies a single clock selected from among the multiphase clocks FCLK_P [n−1: 0] as G_FCLK_P [n−1: 0] to the synchronization detection block 30 and stops the supply of other not-selected clocks G_FCLK_P [n−1: 0] to the synchronization detection block 30. Furthermore, the clock gate unit 60 supplies a single clock selected from among the multiphase clocks FCLK_P [n−1: 0] to the clock change block 70 (to be described later) as G_FCLK_P [n−1: 0] and stops the supply of other not-selected clocks G_FCLK_P [n−1; 0] to the clock change block 70. Then, the clock gate unit 60 carries out gating of the master clock FCLK_M and outputs the clock FCLK_M. The system operates according to this master clock FCLK_M. When stopping the system, the clock gate unit 60 outputs the clock G_FCLK_M to stop the supply of the master clock.

Figure 3:
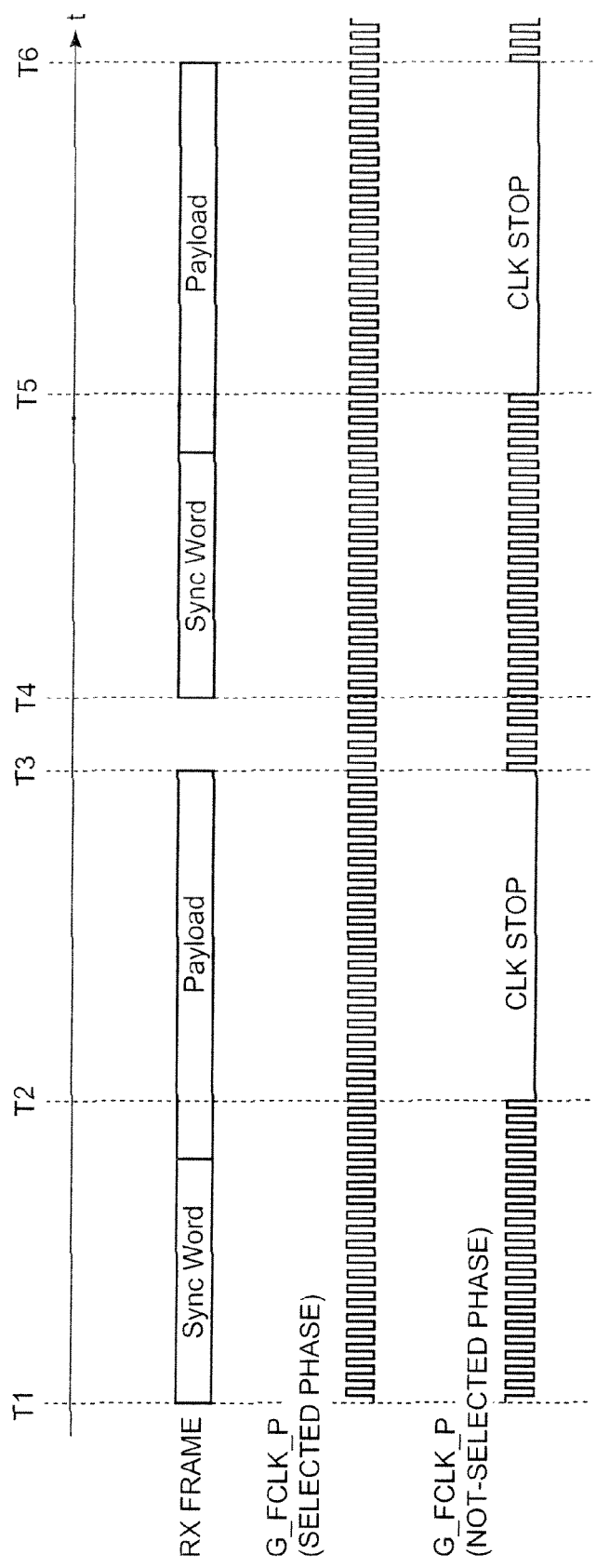
FIG. 3 is a diagram for describing how a clock gate unit carries out clock gating in the first embodiment of the present invention.

Next, there will be described how the clock gate unit 60 carries out clock gating with reference to FIG. 3. As shown in FIG. 3, a receiving (RX) frame for denoting a transmission signal includes a sync word and a payload. The payload follows the sync word in transmission. At first, the synchronization detection block 30, upon receiving a transmission signal at a time T, is activated according to all the clocks G_FCLK_P [n−1: 0]. Then, the synchronization detection block 30 identifies each clock that have successfully sampled the sync word matching with the predetermined sync pattern from among the clocks G_FCLK_P [n−1: 0] and outputs a signal OKFLG [n−1: 0] denoting the identification result to the clock phase selection block 40. The clock control unit 41 of the clock phase selection block 40, upon receiving the signal OKFLG [n−1: 0] from the synchronization detection block 30, outputs an enable signal CLKEN [n−1: 0] that selects each clock to be stopped from among the clocks G_FCLK_P [n−1: 0] to the clock gate unit 60. The clock gate unit 60, upon receiving the enable signal CLKEN [n−1: 0] at T2, supplies a single clock selected from among the clocks FCLK_P [n−1: 0] to the synchronization detection block 30 as a G_FCLK_P clock (selected phase) and stops the supply of other not-selected clocks G_FCLK_P (not-selected phase) to the synchronization detection block 30. In this first embodiment, the payload has a predetermined fixed length. Consequently, the clock control unit 41 outputs the enable signal CLKEN [n−1: 0] only during the clock stop period corresponding to the payload length. Consequently, the clock control unit 41 outputs the enable signal CLKEN [n−1: 0] for specifying each clock to be stopped to the clock gate unit 60 until the T3 is over. At the T3, the clock stop period started at T2 is ended. After the T3, the clock control unit 41 outputs the enable signal CLKEN [n−1: 0] that instructs the supply of all the clocks to the clock gate unit 60 so as to supply all the clocks G_FCLK_P [n−1: 0] to the synchronization detection block 30.

Figure 4:
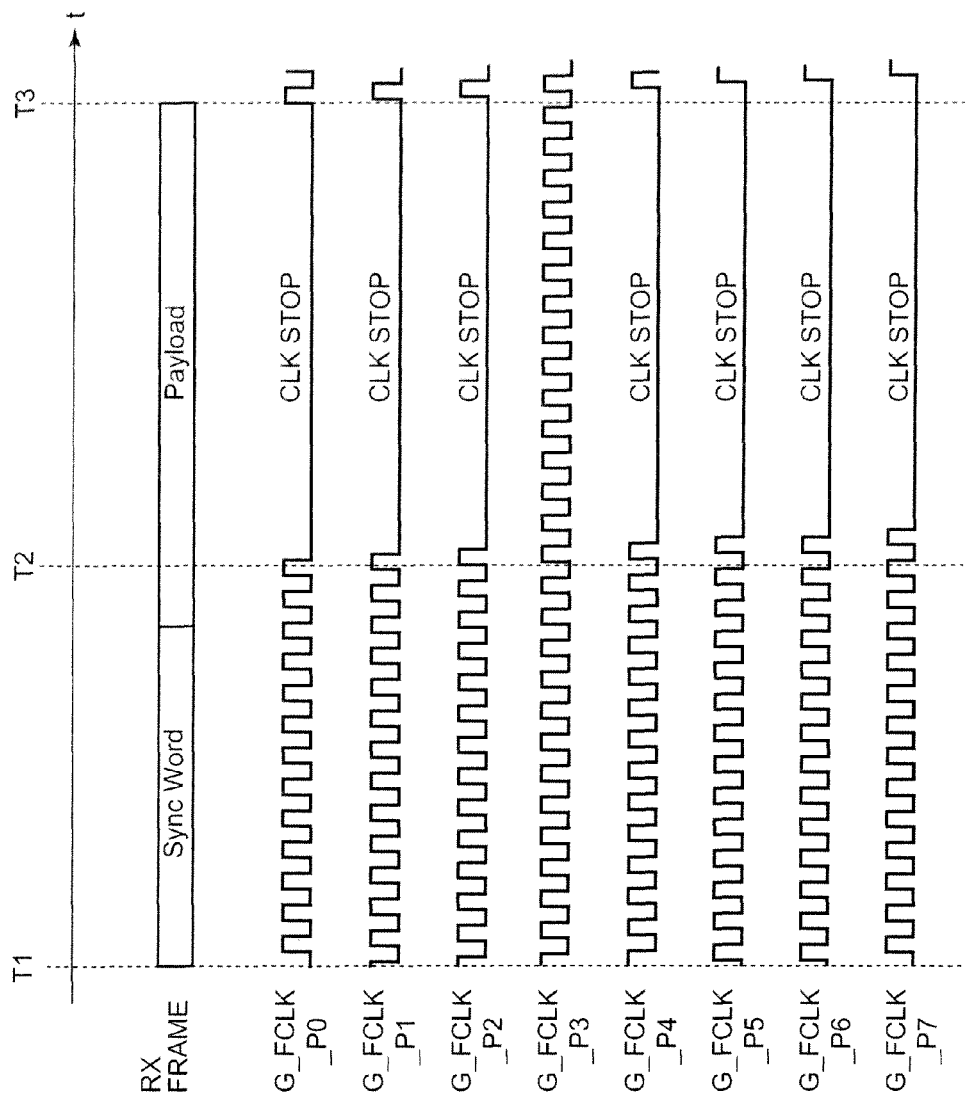
FIG. 4 is another diagram for describing how the clock gate unit carries out clock gating in the first embodiment of the present invention.

FIG. 4 shows how the clock gate unit 60 carries out clock gating when there are eight phases for the clock G_FCLK_P [n−1: 0]. The sync pattern detection units 31a to 31h shown in FIG. 2 operate according to the clocks G_FCLK_P0 to 7 supplied thereto after receiving an RX frame respectively. And as described above, the clock gate unit 60, upon receiving the enable signal CLKEN [n−1: 0] at T2, supplies a single clock G_FCLK_P3 selected from among the clocks FCLK_P0 to 7 to the synchronization detection block 30 and stops the supply of other not-selected clocks G_FCLK_P0 to 7 thereto.

Return to FIG. 1. The clock change block 70, upon receiving a data signal from the synchronization detection block 30 according to the clocks G_FCLK_P [n−1: 0], changes the clock of the received data signal to the master clock G_FCLK_M asynchronously. The circuit that succeeds the clock change block 70 operates according to a single phase master clock G_FCLK_M. On the other hand, the circuit that precedes the clock change block 70 operates according to the multiphase clock G_FCLK_P [n−1: 0]. This is why the clock change block 70 changes the received data signal clock to the master clock G_FCLK_M asynchronously.

As shown in FIG. 2, the elastic store unit 71 provided in the clock change block 70 consists of plural elastic store circuits 71a to 71h. In this first embodiment, each of the elastic store circuits 71a to 71h receives the inputted data signal according to its corresponding one of the clocks G_FCLK_P [n−1: 0] and changes the data signal clock to the master clock G_FCLK_M asynchronously. In FIG. 2, there are eight phases for the clock G_FCLK_P [n−1: 0]. And eight clocks G_FCLK_P0 to 7 having phases different from one another, as well as the master clock G_FCLK_M are used to operate the elastic store circuits 71a to 71h respectively.

The elastic store circuits 71a to 71h use the clocks G_FCLK_P0 to 7 output from the sync pattern detection units 31a to 31h to sample data signals Data_P0 to 7, respectively. After this, the elastic store memory 73 (to be described later) expands the data signals Data_P0 to 7. Then, the expanded data signals are subjected to retiming carried out according to the master clock G_FCLK_M and output to the FIFO unit 80 as data signals Data_M0 to 7. The Data_M [n−1: 0] is a parallel signal denoting an output signal from each of the elastic store circuits 71a to 71h. Corresponding to the plural elastic store circuits 71a to 71h, the Data_M0 to 7 are transmitted in parallel through n signal lines. In this first embodiment, each of the data signals Data_P0 to 7 denotes a payload.

Figure 5:
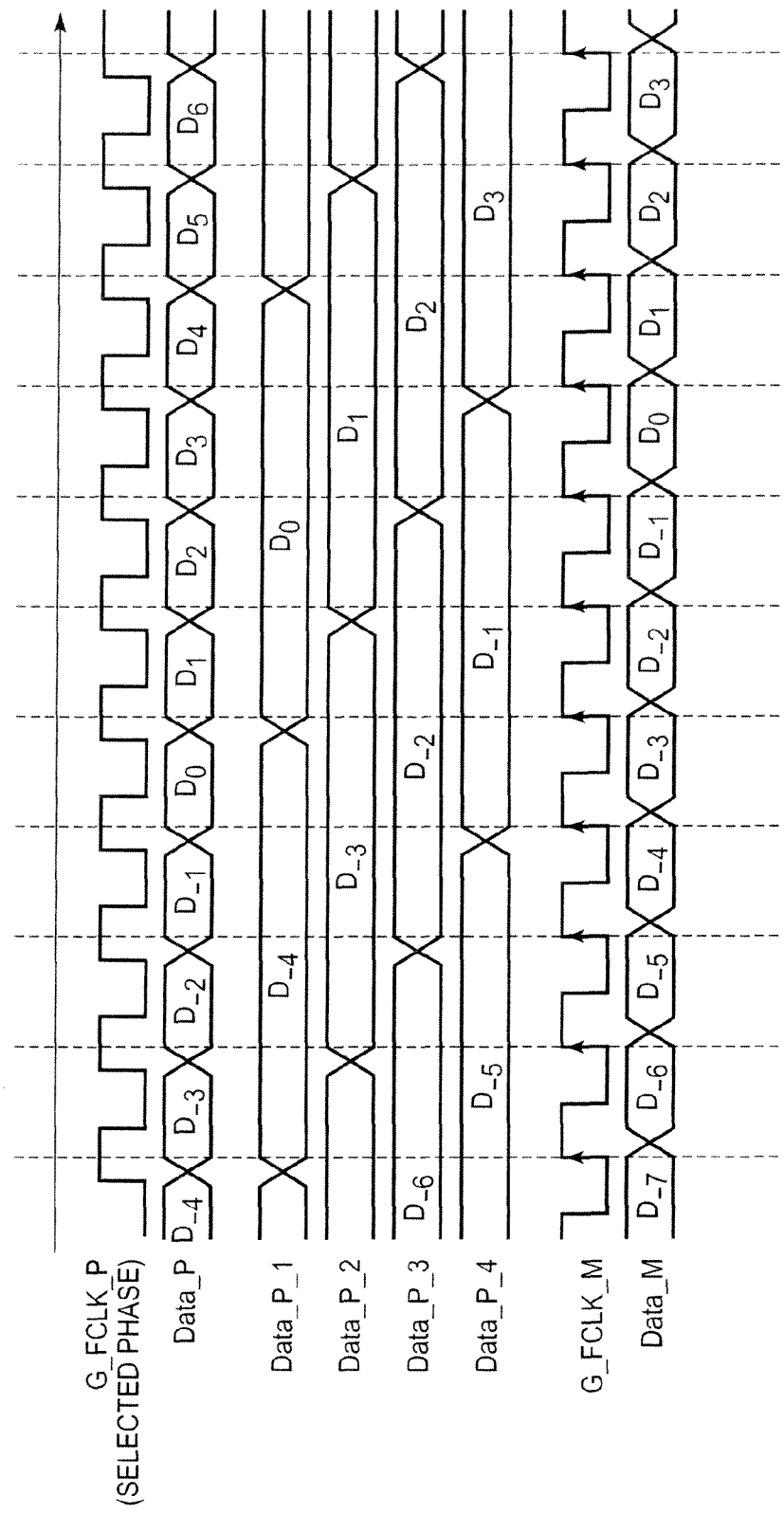
FIG. 5 is a timing chart of the operation of an elastic store circuit in an example in the first embodiment of the present invention.

FIG. 5 is a timing chart for describing the operation of each of the elastic store circuits 71a to 71h in an example. In FIG. 5, the operation of only one of the elastic store circuits 71a to 71h is shown as an elastic store circuit for which its corresponding clock G_FCLK is selected. The operations of other elastic store circuits for which their corresponding clocks G_FCLK are not selected are omitted in FIG. 5.

In FIG. 5, each of the elastic store circuits 71a to 71h receives its corresponding one of the data signals Dara_P according to a clock G_FCLK_P (selected phase). Each of the elastic store circuits 71a to 71h then expands the data signal Data_P to generate its corresponding one of the data signals Data_P_1 to 4 with reference to the clock G_FCLK_P (selected phase). In this first embodiment, each data signal Data_P having one cycle length of the clock G_FCLK_P (selected phase) is expanded to one of the data signals Data_P1 to 4 that is 4 cycles in total length. After this, each of the elastic store circuits 71a to 71h carries out retiming for one of the expanded data signals Data_P1 to 4 according to the master clock G_FCLK_M and outputs the result to the FIFO unit 80 as one of data signals Data_M0 to 7. Consequently, each of the elastic store circuits 71a to 71h comes to change the clock G_FCLK_P (selected phase) of each of the data signals Data_P to the master clock G_FCLK_M, thereby outputting the data signal Data_M. Because each object data signal Data_P is expanded in such a way, each of the elastic store circuits 71a to 71h can sample its corresponding data signal correctly according to the master clock G_FCLK_M even when the data signal Data_P is received according to any of the clocks G_FCLK_P.

The FIFO unit 80 includes a selector 81 and an S/P (serial-parallel) converter 82. The selector 81 selects data signals output from the clock change block 70 according to the selection clock CLKSEL [n−1: 0] and outputs the selected signals to the S/P converter 82. The S/P converter synchronizes the serial data sampled by the FIFO unit 80 according to the internal circuit clock SCLK, thereby the serial data is converted to parallel data, then output as parallel data.

The signal processing circuit 90 processes signals according to the parallel data output from the S/P converter 82 (e.g., the processing is decoding (including path searching, etc.)) according to the parallel data output from the S/P converter 82 to generate control signals used in its succeeding circuit (not shown) or data signals.

Figure 6:
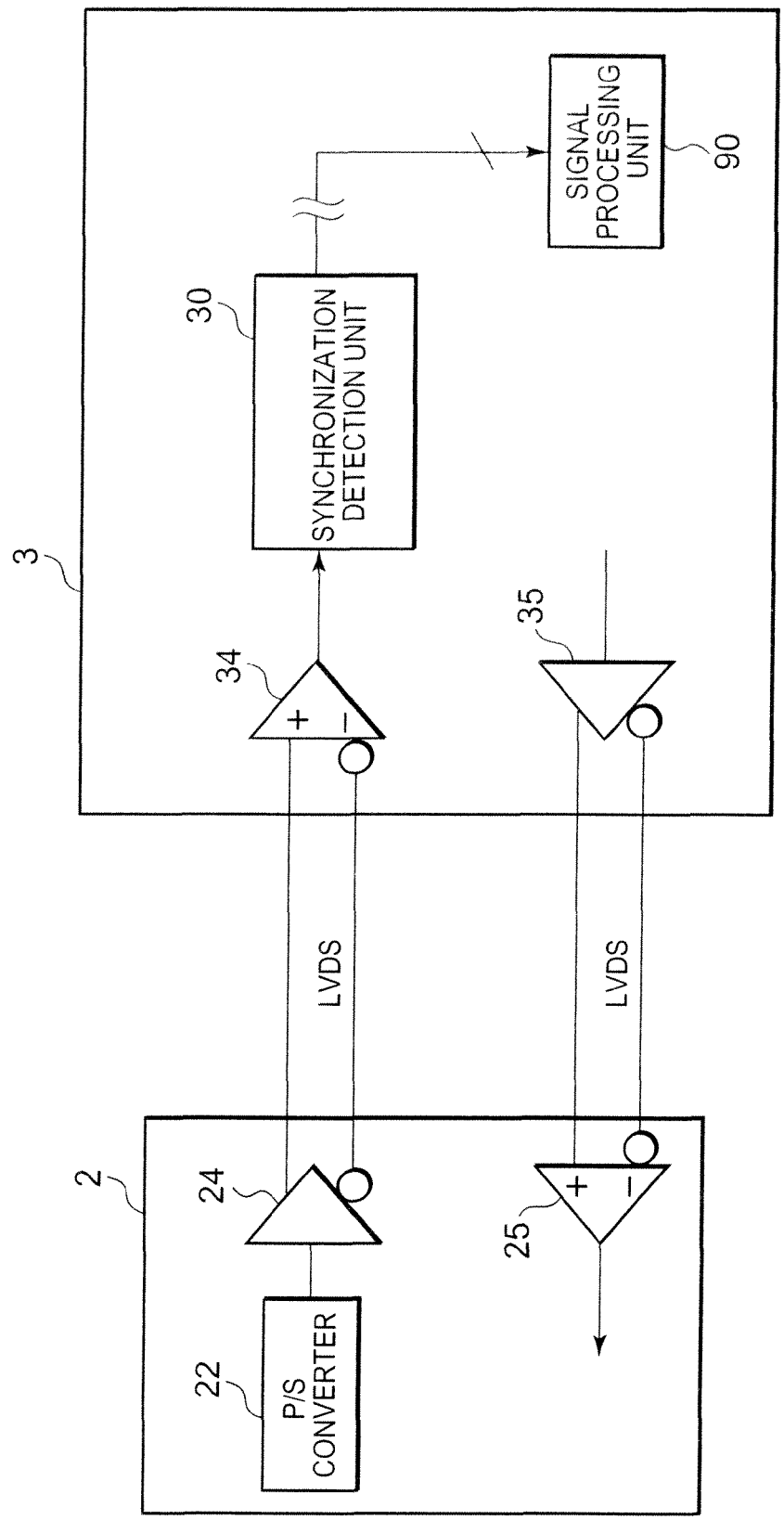
FIG. 6 is a block diagram for describing how signals are sent from an RF unit and received by a DBB in the first embodiment of the present invention.
Figure 7:
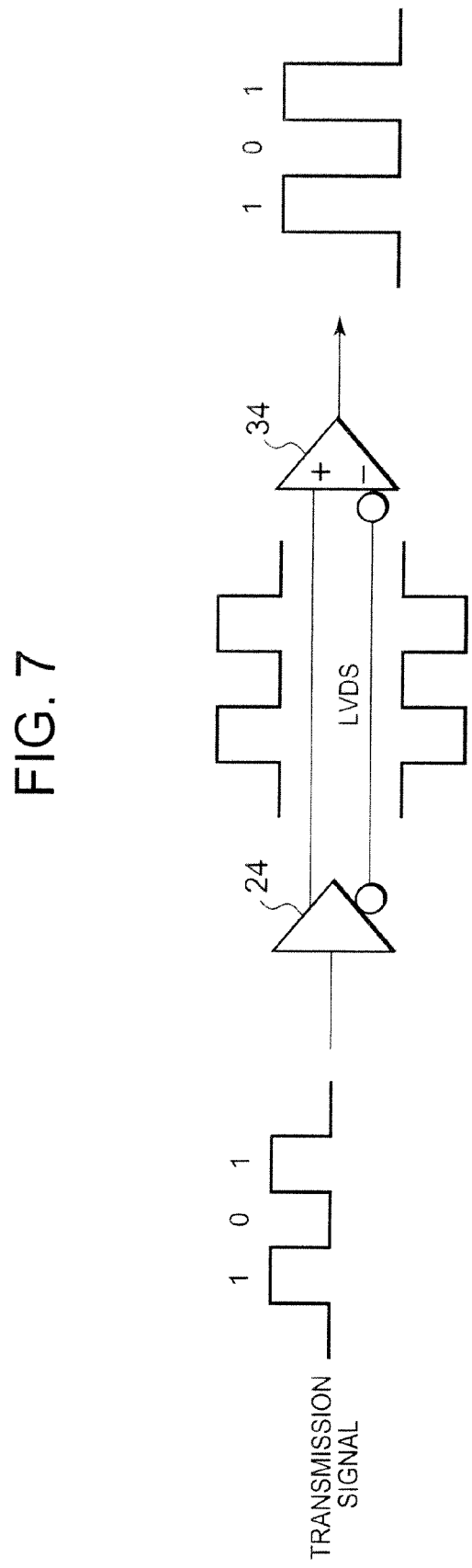
FIG. 7 is a diagram for describing how to send and receive signals in the first embodiment of the present invention.

Signals to be transmitted to the DBB unit 3 from the RF unit 2 should preferably be converted to low voltage differential (LVDS) serial signals before the transmission. For example, as shown in FIG. 6, serial transmission signals output from the P/S converter 22 should be amplified differentially by the driver 24, then the amplified signals are received by the receiver 34. And as shown in FIG. 6, the two signal lines are used for the signal transmission from the driver 24 to the receiver 34. The two signal lines are used to send transmission signals and their inverted signals. Because the differential signals are transmitted through those two signal lines in such a way, the noise resistance can be improved even in case of high speed sending/receiving of low voltage data signals. Furthermore, even in case of signal sending from the DBB unit 3 to the RF unit 2, the signals should preferably be converted to low voltage differential (LVDS) serial signals before they are transmitted to the synchronization detection block. For example, as shown in FIG. 7, serial signals output from the DBB unit 3 may be amplified differentially by the driver 35, then received by the receiver 25 as differential signals.

Second Embodiment

Figure 8:
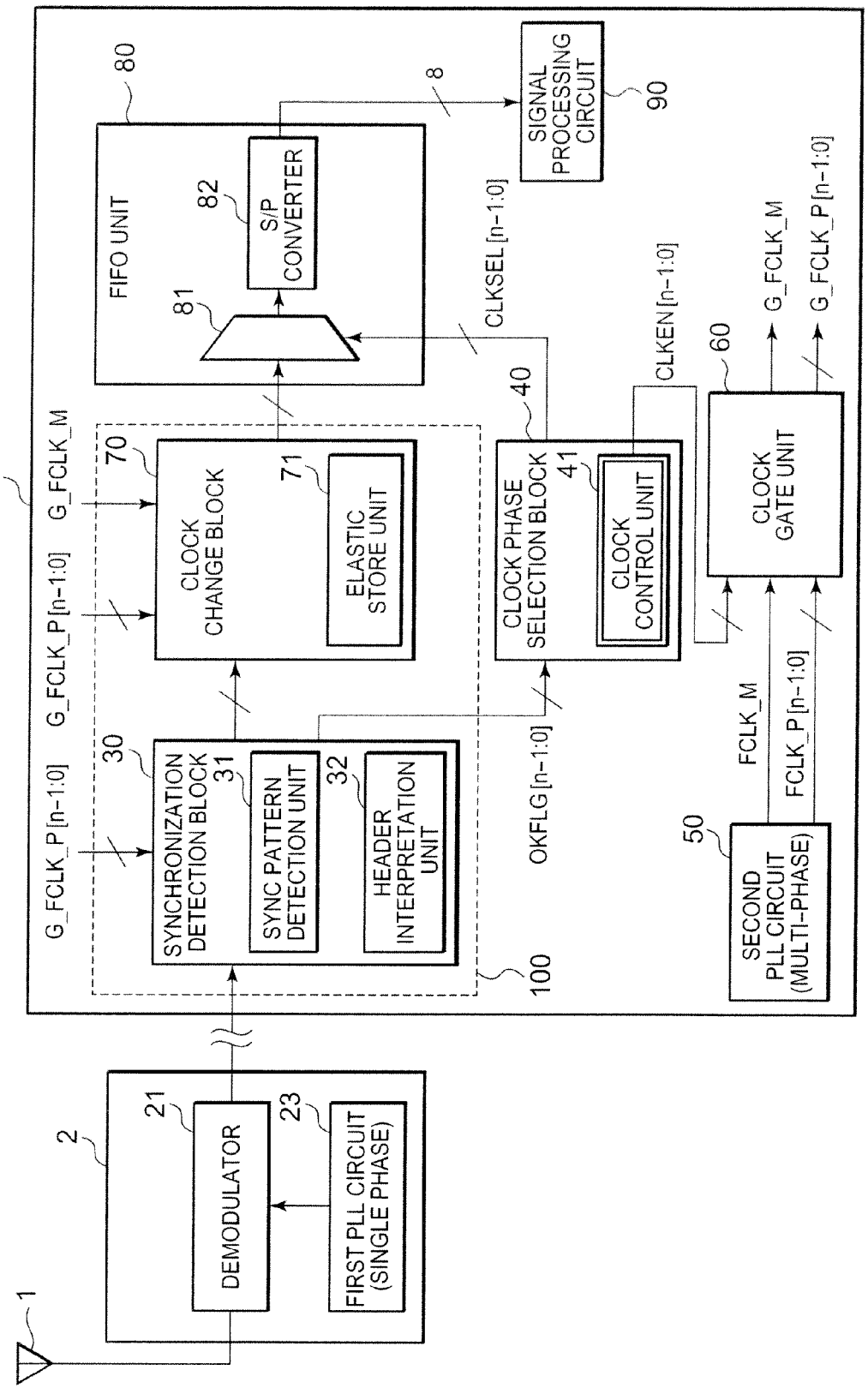
FIG. 8 is a block diagram of a receiving apparatus in a second embodiment of the present invention.

Next, there will be described a configuration of a communication apparatus (concretely, a receiving apparatus) in this second embodiment with reference to FIG. 8. In FIG. 8, the same reference numerals will be used for the same components as those shown in FIG. 1 in the first embodiment described above. The receiving apparatus includes an antenna 1, a high frequency (RF) unit 2, and a digital baseband (DBB) unit 3. The configurations and functions of the antenna 1 and the RF unit 2 are the same as those in the first embodiment, so their descriptions will be omitted here.

Each transmission signal in this second embodiment includes a sync word region, a header region, and a payload region in its data string. The sync word region stores the sync word set beforehand in the subject system. The header region stores various control information items used to control the system. The payload region stores data to be processed in the system. The system receives the sync word and the header sequentially. Then, the system receives the payload. The sync word manages the unit of payload transmission.

The DBB unit 3 includes a synchronization detection block 30, a clock phase selection block 40, a second PLL circuit 50, a clock gate unit 60, a clock change block 70, an FIFO unit 80, and a signal processing unit 90. As shown in FIG. 8, the synchronization detection block 30 of the receiving apparatus in this second embodiment further includes a header interpretation unit 32. This is different from the configuration of the receiving apparatus in the first embodiment.

The header interpretation unit 32 receives each transmission signal by using plural clocks of which phases are different from each other. The header interpretation unit 32 then interprets the header included in the received signal to obtain the length information of the payload, which is also included in the received signal. The header interpretation unit 32 operates according to the n clocks G_FCLK_P [n−1: 0] of which phases are different from each other. The header interpretation unit 32 outputs the length information of the payload that follows the header to the clock phase selection block 40.

The clock phase selection block 40 selects a single clock from among the clocks G_FCLK_P [n−1: 0] that have successfully sampled the sync word matching with the predetermined sync pattern. The single clock is used to sample the object transmission signal. The clock phase selection block 40 then outputs an instruction to stop all the other not-selected clocks. The clock phase selection block 40 includes a clock control unit 41. The clock control unit 41 controls so as to stop the clocks that are not as sampling clocks and not required to receive the payload that follows the header. The clock phase selection block 40 in this second embodiment is characterized by the adjustment of the clock stop period carried out according to the header information.

Concretely, the clock phase selection block 40 calculates the clock stop period according to the obtained payload length information. After this, the clock phase selection block 40, upon receiving the signal OKFLG [n−1: 0] output from the synchronization detection block 30, selects a sampling clock from among the clocks G_FCLK_P [n−1: 0] determined as selectable ones. The clock phase selection block 40 then outputs a selection signal CLKSEL [n−1: 0] that denotes the selected clock to the selector 81 of the FIFO unit 80.

The clock control unit 41, upon receiving the signal OKFLG [n−1: 0] output from the synchronization detection block 30, outputs an enable signal CLKEN [n−1: 0] to the clock gate unit 60 only during the calculated clock stop period. The enable signal specifies the clocks to be stopped among the clocks $G_{13}$ FCLK_P [n−1: 0].

The clock gate unit 60, upon receiving the enable signal CLKEN [n−1: 0] from the clock control unit 41, carries out gating of the master clock FCLK_M and the multiphase clock FCLK_P [n−1: 0] supplied from the second PLL circuit 50 during the clock stop period.

Figure 9:
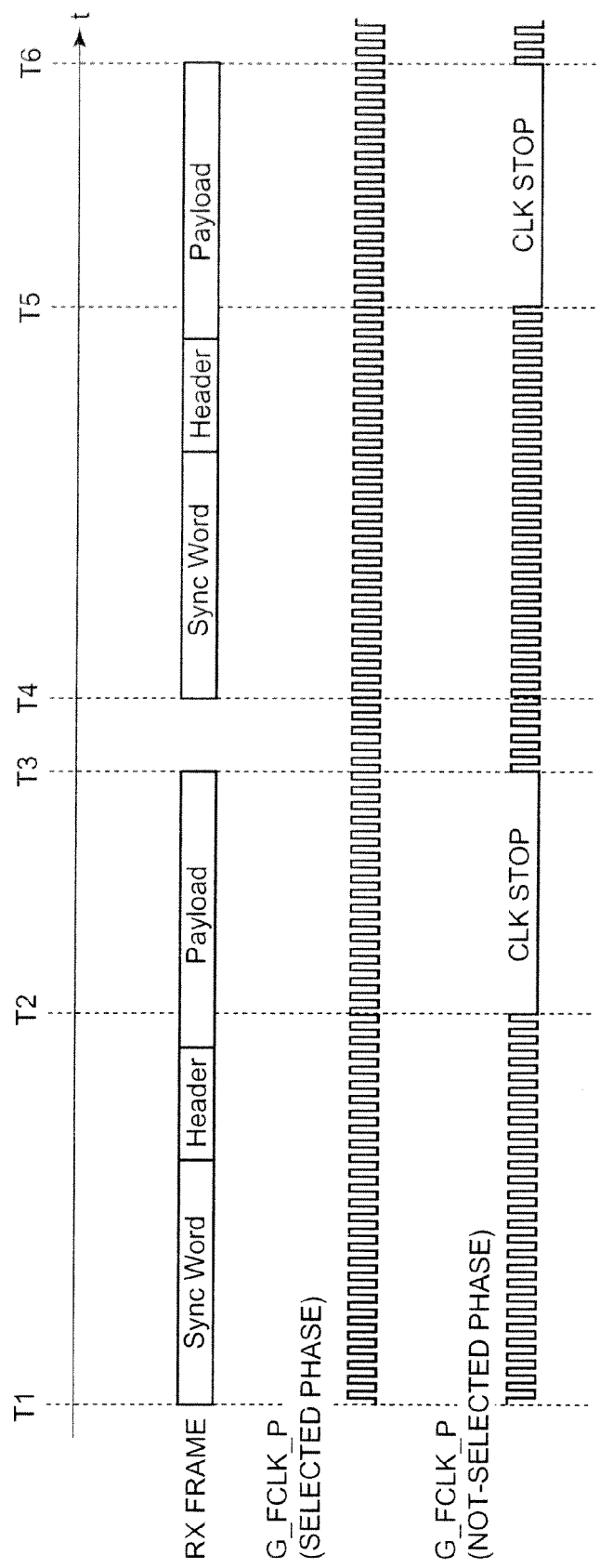
FIG. 9 is a diagram for describing how a clock gate unit carries out clock gating in the second embodiment of the present invention.

Next, there will be described how the clock gate unit 60 carries out the clock gating with reference to FIG. 9. As shown in FIG. 9, the receiving (RX) frame that denotes the object transmission signal includes a sync word, a header, and a payload. The clock gate unit 60 receives the sync word, the header, and the payload sequentially.

At first, the synchronization detection block 30 receives the transmission signal at a time T1, then starts its operation according to all the clocks G_FCLK_P [n−1: 0]. The sync pattern detection unit 31 of the synchronization detection block 30 outputs a clock OKFLG [n−1: 0] selected from among the clocks G_FCLK_P [n−1: 0] to the clock phase selection block 40. The clock OKFLG [n−1: 0] denotes each clock that has successfully sampled the predetermined sync pattern correctly. Upon receiving the OKFLG signal, the clock phase selection block 40 selects a single clock among the clocks that have successfully sampled the predetermined sync pattern. This operation is the same as that in the first embodiment. On the other hand, the header interpretation unit 32, upon receiving the transmission signal, interprets the header included in the received transmission signal to obtain the payload length information. The header interpretation unit 32 then outputs the obtained payload length information to the clock phase selection block 40. After this, the clock phase selection block 40 calculates a clock stop period according to the obtained payload length information. The clock control unit 41 of the clock phase selection block 40 thus stops the supply of all the clocks except for the single clock selected according to the signal OKFLG [n−1: 0] output from the synchronization detection block 30. This means that the clock control unit 41 outputs an enable signal CLKEN [n−1: 0] to the clock gate unit 60. The enable signal CLKEN [n−1: 0] specifies the clocks to be stopped among the clocks G_FCLK_P [n−1: 0]. Upon receiving the enable signal CLKEN [n−1: 0] at the time T2, the clock gate unit 60 supplies the single clock selected from among the clocks G_FCLK_P [n−1: 0] to the synchronization detection block 30 as G_FCLK_P (selected phase). At the same time, the clock gate unit 60 stops the supply of other not-selected clocks G_FCLK_P (not selected phase) to the synchronization detection block 30. In this second embodiment, the payload length is assumed to be variable. Consequently, the clock control unit 41 calculates the clock stop period according to the payload length and outputs the enable signal CLKEN [n−1: 0] only during the calculated clock stop period. As a result, the clock control unit 41 outputs the enable signal CLKEN [n−1: 0] that specifies the clocks to be stopped to the clock gate unit 60 between the time T2 and the time T3, at which the clock stop period is ended. After the T3 is ended, the clock control unit 41 outputs another enable signal CLKEN [n−1: 0] to the clock gate unit 60. The enable signal CLKEN [n−1: 0] specifies starting of the supply of all the clocks G_FCLK_P [n−1: 0] to the synchronization detection block 30.

The configurations and functions of the second PLL circuit 60, the clock change block 70, the FIFO unit 80, and the signal processing circuit 90 are the same as those in the first embodiment described above, so their descriptions will be omitted here.

As described above, the communication apparatus of the present invention can identify each clock OKFLG [n−1: 0] that has successfully sampled the predetermined sync word among plural clocks FCLK_P [n−1: 0]. The communication apparatus selects a single clock CLKSEL [n−1: 0] from among the identified clocks and used to sample the object transmission signal, then outputs an instruction CLKEN [n−1: 0] that stops the supply of other not-selected clocks. Upon receiving the clock stop instruction CLKEN [n−1: 0], the communication apparatus supplies the clock G_FCLK_P [n−1: 0] selected from among the plural clocks FLCK_P [n−1: 0] and stops the supply of other not-selected clocks. Consequently, after selecting the supply clock, the communication apparatus stops the supply of other unnecessary clocks, thereby the LSI power consumption can be reduced.

This means that the communication apparatus of the present invention can realize the synchronization by using n sampling blocks having the same speed and having phases different from one another by 360°/n. After the synchronization is realized, only one representative sampling clock is used for sampling the data signal that follows the sync word and stops other (n−1) sampling clocks while receiving the data signal. Furthermore, the ending position of the frame is estimated from the header included in the transmission signal and the operation of each stopped clock is started automatically. Consequently, the supply of other unnecessary clocks is stopped and started autonomously while character synchronization is realized, thereby unnecessary power consumption related to the LSI circuit operations can be reduced.

Next, there will be described the effects of the present invention. The LSI power consumption described above can be represented by the following equation. The Pt represents switching probability. The fCLK represents an operation frequency. The CL represents a load capacitance. The IO represents a current correction coefficient. The S represents a correction coefficient of the Vt. Here, the first right part represents the power consumption of a switching operation and the second right part represents a leak power.

$$P = p_t \cdot f_{CLK} \cdot C_L \cdot V_{DD}^2 + I_0 \cdot 10^{\frac{V_{th}}{S}} \cdot V_{DD} \quad \text{[Equation 1]}$$

According to the present invention, therefore, because the clocks (n−1) determined to have unnecessary phases respectively are stopped during each operation of synchronization detection, no unnecessary operations are required for the logic circuits (synchronization detection block 30 and the clock change block 70) disposed in precedence of the FIFO unit 80. Consequently, as to be understood from the equation 1, the power consumption required in the first right part can be reduced by stopping the supply of unnecessary clocks $f_{CLK}$. Furthermore, the longer the payload length is, the more the stop period rate can be extended with respect to the clock operation time, so the effect of the power consumption can be improved more.

While the preferred embodiments of the present invention have been described, it is to be understood that modifications will be apparent to those skilled in the art without departing from the spirit of the invention. It is apparent that the present invention is not limited to the above embodiments, but may be modified and changed without departing from the scope and spirit of the invention.

What is claimed is:

1. A communication apparatus, comprising:
    a clock generation circuit outputting a plurality of clocks, each of said plurality of clocks having a different phase from each other;
    a synchronization detection block receiving a sync word and a payload having a predetermined length after receiving said payload, sampling said sync word by using each of said plurality of clocks, and to output a first signal indicating a clock or clocks capable of sampling said sync word successfully, said synchronization detection block being capable of sampling said payload by using a clock or clocks inputted thereinto;
    a clock phase selection block coupled to said synchronization detection block to receive said first signal to select one of said plurality of clocks in accordance with said first signal and to output a second signal indicating a selected clock; and
    a clock gate unit coupled between said clock generation circuit and said synchronization detection block and coupled to said clock phase selection block to receive each of said plurality of clocks and said second signal to output said selected one of said plurality of clocks to said synchronization detection block, and not to output a rest of said plurality of said clocks based on said second signal during a period corresponding to said predetermined length of said payload.

2. The communication apparatus according to claim 1, wherein said length of said payload is fixed.

3. The communication apparatus according to claim 1, wherein said synchronization detection block receives said header after receiving said sync word and before receiving said payload, and
    wherein said detection block further comprises a header interpretation unit interpreting said header and obtaining information indicating said predetermined length of said payload, said header interpretation unit outputting said information to said clock phase selection block.

4. The communication apparatus according to claim 3, wherein said clock phase selection block calculates said period in accordance with said information.

* * * * *